March 22, 1960   L. A. GRIBLER   2,929,364
FLUID POWER STEERING REACTION LIMITING VALVE
Filed April 26, 1955   4 Sheets-Sheet 1

INVENTOR
Ludwig A. Gribler
BY
J. C. Thorpe
ATTORNEY

March 22, 1960  L. A. GRIBLER  2,929,364
FLUID POWER STEERING REACTION LIMITING VALVE
Filed April 26, 1955  4 Sheets-Sheet 3

Inventor
Ludwig A. Gribler
By J. C. Thorpe
Attorney

March 22, 1960  L. A. GRIBLER  2,929,364
FLUID POWER STEERING REACTION LIMITING VALVE
Filed April 26, 1955  4 Sheets-Sheet 4

INVENTOR
Ludwig A. Gribler
BY
J. C. Thorpe
ATTORNEY

2,929,364

FLUID POWER STEERING REACTION LIMITING VALVE

Ludwig A. Gribler, Saginaw, Mich., assignor to General Motors Corporation, Detroit, Mich., a corporation of Delaware Application April 26, 1955, Serial No. 504,003

5 Claims. (Cl. 121—46.5)

This invention relates to the power steering of automotive vehicles and more particularly concerns a fluid operated power steering gear having improved operating characteristics.

The more successful of the fluid power steering systems presently in use employ oil as the fluid medium and comprise a control valve through which the oil is normally continuously circulated by an engine driven pump. This valve is normally open to a double-acting fluid motor consisting, usually, of a power cylinder having a piston therein of a diameter set by the operating pressures desired to be used. The motor may be positioned either remotely from the casing confining the worm end of the steering shaft and associated parts or it may be integrated with these parts. Assuming a predetermined steering resistance, one of the valve parts is caused to slide or rotate (depending on the nature of the valve) in one direction or the other, as governed by the direction of rotation of the steering wheel, to substantially or completely confine the flow of oil to only one end of the cylinder while retarding or preventing exhaustion of any oil from such end. This brings about the desired powering of the steering member which continues until release of the effort at the steering wheel, when the valve parts become automatically centered, i.e. restored to their normal relative positions.

In order to obtain a steering "feel," which would otherwise be lacking, a spring system providing a resistance required to be overcome incident to any relative movement of the valve components is ordinarily built into the valve. Such resistance is normally supplemented by a hydraulic force operating in opposition to displacement of the valve parts and bearing a direct relation to the steering resistance. The over-all resistance may amount, for example, to about three-four pounds effort at the steering wheel, in which case the steering on smooth roads at normal cruising speeds may be entirely manual, the power means coming into play only at lesser speeds and during parking operations, for instance.

A principal disadvantage inherent in apparatus of the above type so far proposed goes to the fact that in order to develop a sufficiently high hydraulic resistance at higher speeds the hydraulic resistance at low speeds, e.g., 2–10 m.p.h. must be made so substantial as to give rise to complaints that the manual effort required at low speeds is unduly great.

The present invention has as its main object to correct the undesirable condition just indicated.

Other objects and features of the invention will be apparent from the following specific description of a preferred embodiment thereof. The description will proceed with reference to the accompanying drawings wherein.

Figure 1:
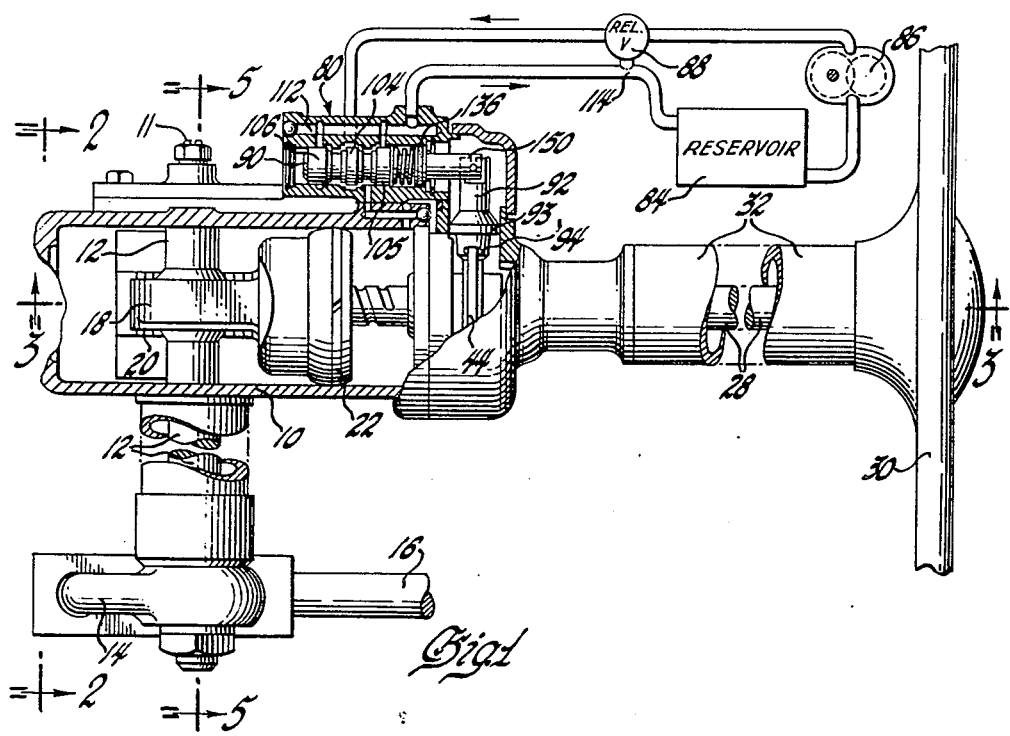
Fig. 1 is a broken plane view in which certain parts appear in section.
Figure 2:
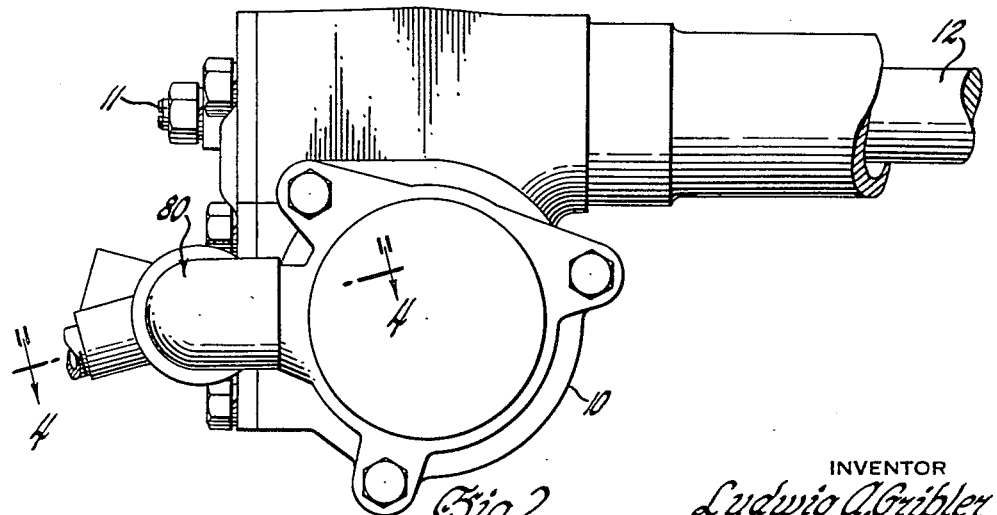
Fig. 2 is a view taken on the line 2—2 in Fig. 1.

In the drawings, and referring first to Figure 1, the numeral 10 denotes a casing or a gear box of generally cylindrical conformation. Disposed partly within such casing and extending at one side thereof is a cross or rock shaft 12 connected externally of the casing with a pitman arm 14 through which a drag link 16 is actuated. The linkage beyond the drag link may be assumed as conventional.

Figure 5:
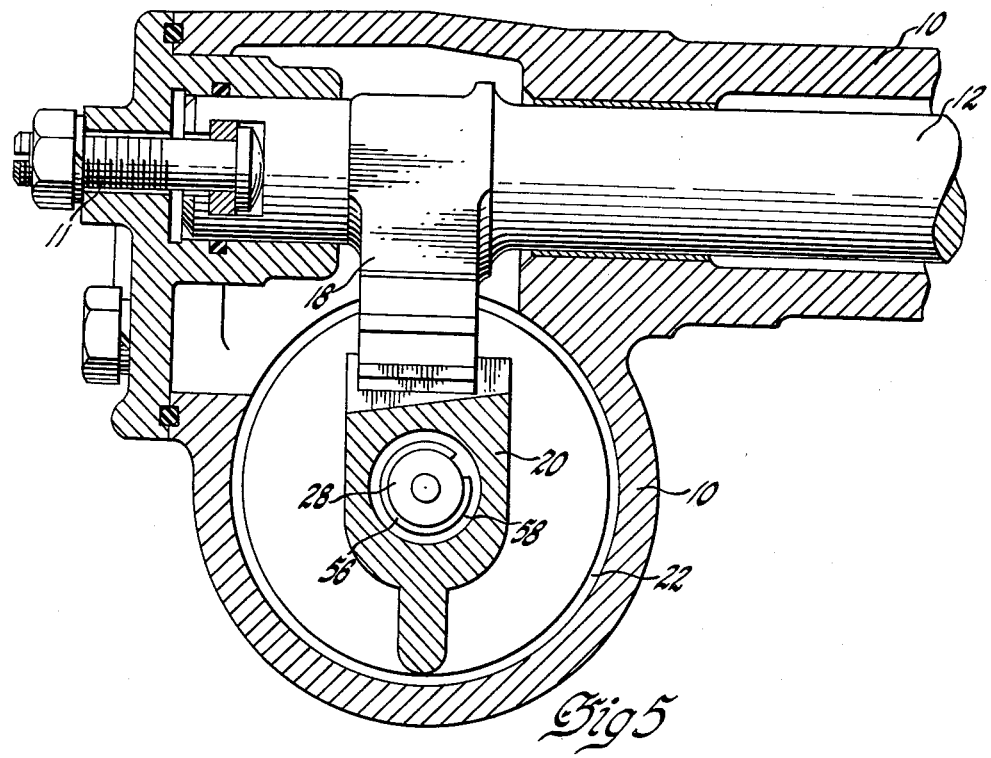
Fig. 5 is a section on the line 5—5 in Fig. 1.

Fixed to or integral with the rock shaft 12, within the casing 10, is a gear sector 18 (Fig. 3), the teeth of which mesh with those of a rack 20 formed integral with a piston 22 reciprocal within the casing. A screw device 11 (Fig. 5) of known construction allows for the adjustment of lash between the teeth.

Piston 22 is bored and counterbored to accommodate a ball nut 24 and the worm end 26 of a steering shaft 28 which terminates at its upper end (Fig. 1) in the usual steering wheel 30.

Shaft 28 is shown as surrounded mediate the wheel 30 and the casing 10 by the usual tubular column or mast jacket 32. At its enlarged lower end column 32 is shouldered into an adapter plate 34 closing the upper end of the casing 10 (Fig. 3) and partially confining a thrust bearing 36 for the shaft 28. This bearing includes an annular central race piece 44 for balls 45 which at installation are placed under a predetermined load by a nut 43 operating to force the lower of the outer race pieces 46, enveloped by retainers 50, into shouldering engagement with the shaft 28 at 48. Surrounding the lower race piece 46 and accommodated in recesses formed in the adapter 34 are two sets of springs 29 and 29a, these springs, of which there may be three apiece, for example, being alternately positioned around the adapter. Each spring 29 surrounds a corresponding rivet 31 secured to the central race piece 44 and having a flanged head 51. This flanged head and a washer 53 provide the seats for the spring. The washer 53 is spaced from the adapter 34 a distance equal to the spacing 44a between the central race piece 44 and the steering column 32. Springs 29a, as shown, seat directly against the adapter 34 and against the washer 53.

Steering shaft 28, which is supported for limited axial movement, extends through a seal 52 in the adapter 34 and carries a seal 54 at its lower tip end, the latter seal being held in place via a lock ring 56 and retainers 58. The shaft has a central bore extending through the worm portion thereof and connecting with a short passageway 62 leading to the chamber within which the thrust bearing 36 is disposed. The purpose of these passageways is to bleed the cavity between the tip end of the worm portion of the shaft and the closure cap 66.

Ball nut 24 is held in place within the piston 22 via a lock ring 68. It is believed evident from this arrangement that relative axial movement, as between the nut and piston, is not possible. A pin 70 received in a keyway 72 formed in the nut prevents relative rotary movement of the two parts. Except for the keyway, the ball nut is substantially structurally identical to the conventional article well known in the art. In this circumstance, a detailed description thereof is believed unnecessary. Suffice it to say that as the steering shaft 28 is rotated, the nut, and with it the piston, tends to move axially of the casing 10 by reason of the helical ball connection interconnecting the shaft and nut. The balls 74 are returned from one end of the nut to the other via a return tube 76 appearing in section in Fig. 3.

Reverting now to Fig. 1, there will be seen a valve 80, the housing 82 of which is fixed to the casing 10. Such valve controls the flow of fluid, normally a mineral oil of suitable viscosity characteristics, between the casing 10, in effect a power cylinder, and a reservoir 84, illustrated diagrammatically. This reservoir serves a pump 86, discharging through a relief valve 88 which becomes effective to by-pass fluid to the reservoir whenever the pressure in the hydraulic circuit becomes excessive, damage to any of the component parts of the system being thereby prevented.

Valve 80 is of the so-called "open-center" type and comprises a spool 90 which is linked through a lever 92, rock-pivoted at 93, and through the previously mentioned race piece 44 to the steering shaft 28. Lever 92 is slotted at 94 to provide the connection with the race piece.

As well understood in the art, any substantial resistance of the rock shaft 12 to turning incident to the rotation of the steering shaft 28 will result in a reactionary thrust on the shaft 28 tending to impart axial movement thereto, the movement being downward in the instance of a right turn, upward in the case of a left turn. It is this reactionary axial movement which is utilized to bring about automatic actuation of the spool 90. That the bearing 36, including the race piece 44, partakes of any axial movement of the steering shaft 28 (occurring against the resistance of springs 29 or 29a) should be obvious, considering the nature of the connection between the bearing and the shaft.

Figure 4:
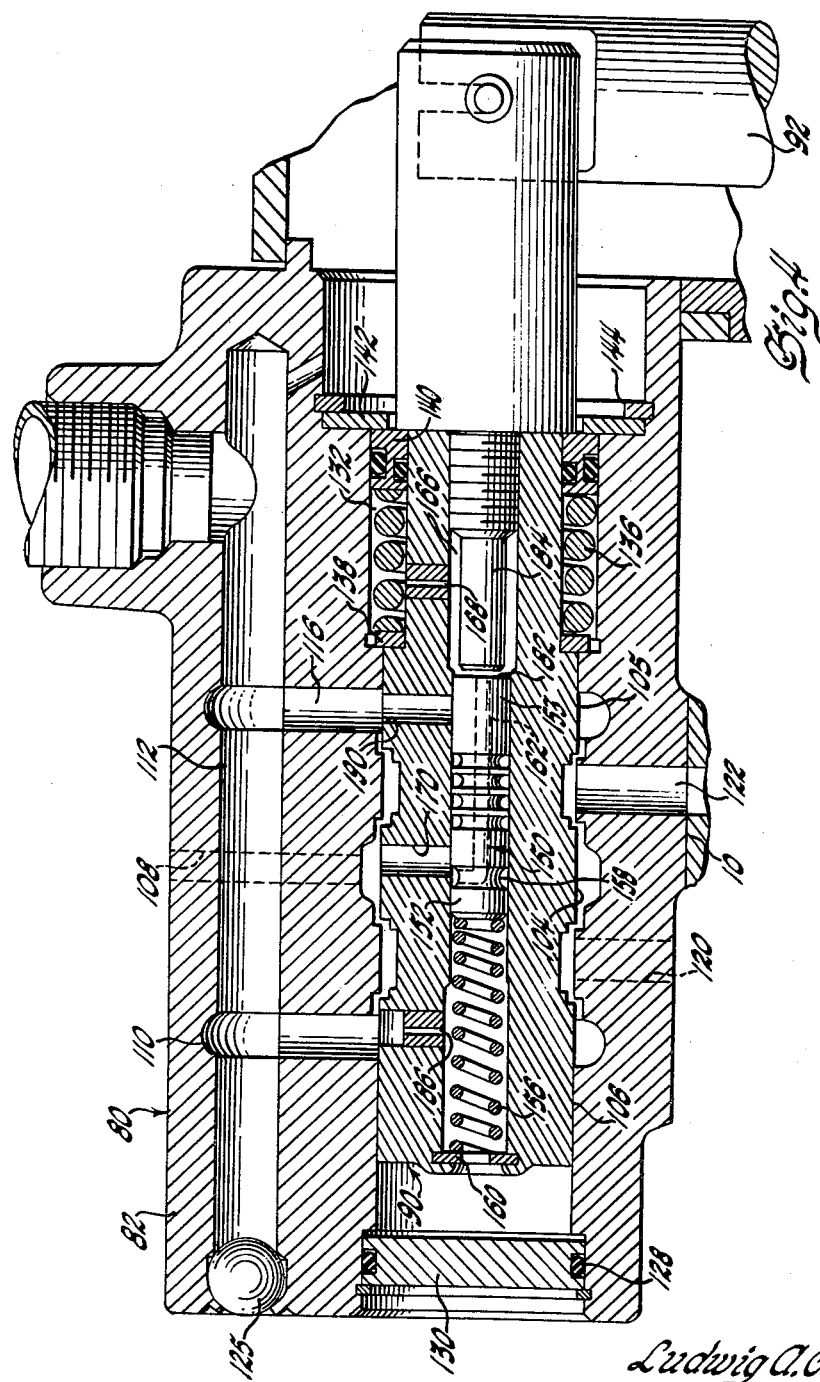
Fig. 4 is an enlarged section of the valve component of the power steering gear.

As best seen from Fig. 4, spool 90 is formed with three lands 104, 105, and 106. With the spool centered in the housing 82, as shown, the stream of fluid entering the passageway 108 from the pump is divided at the central land 104. The part diverted to the left flows about the spool to enter passageway 110 which interconnects with a longer passageway 112 extending to the exhaust line 114 to the reservoir. Similarly, the part divided to the right flows about the spool to the passageway 116 which also connects with the exhaust line. In either case, the flow of liquid is against the static pressure of the fluid contained in the casing 10, passageways 120 and 122 being open, respectively, to the left and right-hand chambers of the casing. Now on movement of the spool in either direction, it should be clear that the fluid flow is partially or completely restricted to one or the other side of the valve, depending upon the direction of the movement. Thus, if the spool is displaced to the right, as is the case when the steering shaft reacts axially downwardly on a right turn, the consequent blocking off of the right side of the valve results in the building up of a pressure in the left-hand chamber of the casing 10, providing the desired power assist. With the spool so displaced, land 106 partially or completely seals off the left-hand chamber of the casing from the exhaust passageway 112, while the opposite chamber of the casing is necessarily open to such passageway to a greater extent than when the spool is in neutral position. Obviously, when the spool is displaced to the left rather than the right, the effect is just the reverse of that described.

It will be understood that ball 125 is merely a plug closing the end of the bore hole providing the common exhaust passageway 112.

A seal 128 accommodated by a closure 130 fitted into the valve housing prevents leakage past the closure. At the opposite end of the spool 90 is an annular chamber 132 confining a spring 136 abutting a seat 138 at one end and a sealing member 140 at the other end. This sealing member is backed by a ring 142 locked in place by a second ring 144. With such arrangement, it should be clear that movement of the spool 90 in either direction is resisted by the spring, which thus tends to maintain the spool in its centered position, as shown.

Spool 90 is centrally bored to accommodate an auxiliary valve in the form of a plunger generally indicated at 150. This plunger includes a portion 152 annularly grooved at 158 and an integral stem portion 153, the portion 152 being abutted by a spring 156, backed by a ring 160 accommodated in a circular groove in the spool 90. A bore 162 in the plunger provides a passageway extending to an annular chamber 166, which communicates with the chamber 132 via a restricted passageway 168.

With the plunger 150 in its shown position, it should be evident that fluid entering through the valve inlet has access to the chamber 132 (where the fluid acts to supplement the centering action of spring 136) via the radial passageway 170 in the spool 90, the annular groove 158, the bore 162 and the restricted passageway 168. It should further be evident that the shifting of the spool 90 in either direction will not prevent fluid flow to the chamber 132 by the route just described, so long as the plunger 150 remains in its position shown. And this is the relation of the parts at all vehicle speeds excepting those obtaining during parking and maneuvering in close quarters, when because of the increased steering resistance a higher line pressure develops. On such occurrence, the increased pressure in the annular chamber 166 caused by the pressure build-up in chamber 132 results in leftward movement of the plunger against the resistance of the spring 156 to close off the radial passageway 170. With less fluid resistance to its movement the spool 90 naturally becomes easier to displace which, of course, means that the manual effort required at the steering wheel is less than heretofore. Any build-up of pressure in the chamber 132 incident to movement of the spool with passageway 170 closed, finds relief through an exhaust passageway 190 which becomes open on further leftward displacement of the plunger 150 caused by such pressure build-up. Plunger 150 thus acts both as a pressure limiting valve and as a pressure relief valve.

The reaction surface against which the fluid works to cause leftward movement of the plunger 150 is the annular area indicated at 182 normally abutting the shank of the threaded closure plug 184. Spring 156 is, of course, gauged to restore the plunger to its normal position once the pressure in the chamber 132 has become reduced to the predetermined value.

Fluid bleeding past the left-hand land of the plunger 150 has egress to exhaust through the restricted passageway 186.

Figure 6:
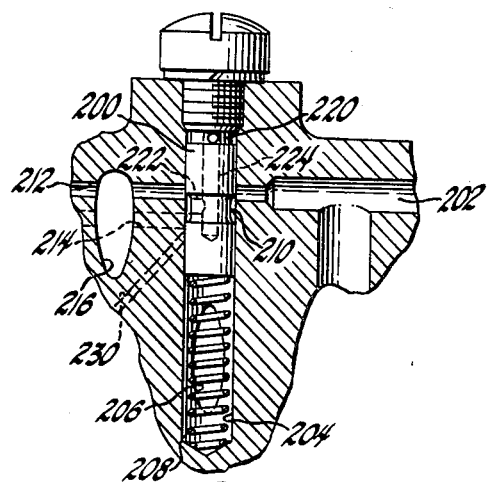
Fig. 6 is a fragmentary section illustrating a modified valve construction.

The invention herein may be practiced using an auxiliary valve disposed otherwise than just described. This is illustrated by the fragmentary section of Fig. 6 wherein the plunger element 200 functionally corresponds to plunger 150. In this instance the pressure passageway 202 which is open at all times to the valve inlet is formed in the housing for the member representing the counterpart of spool 90 (Fig. 4). The passageway 202 is bisected by an exhaust passageway 204 (also formed in the valve housing) communicating with an aperture 206, in turn communicating with a common exhaust corresponding to line 112 in Fig. 4.

A spring 208 tends to maintain the plunger 200 in its shown position in the exhaust passageway 204. Thus, fluid from the valve inlet is permitted to flow about the annular groove 210 through the lines 212, 214 into a duct 216 which communicates directly with the reaction chamber, not shown, corresponding to chamber 132 (Fig. 4). When the pressure in such chamber reaches a value corresponding to parking conditions the plunger 200 is depressed against the resistance of the spring 208 by the fluid pressure developing at 220 above the plunger, this space 220 being in communication with the reaction chamber through intersecting passageways 222 and 224 drilled or otherwise formed in the plunger.

On the depression of the plunger, such action being accompanied by the blocking off of the pressure passageway 202, groove 210 approaches registration with a passageway 230 in the valve housing, which passageway like the opening 206, leads to exhaust. Actual registration of the groove and passageway 230 occurs on further depression of the plunger caused by build-up of pressure in the reaction chamber incident to movement of the main valve spool (Fig. 4) with passageway 202 closed. Thus, the plunger 200 acts just as the previously described plunger 150, i.e. as both a pressure limiting valve and a pressure relief valve.

Figure 3:
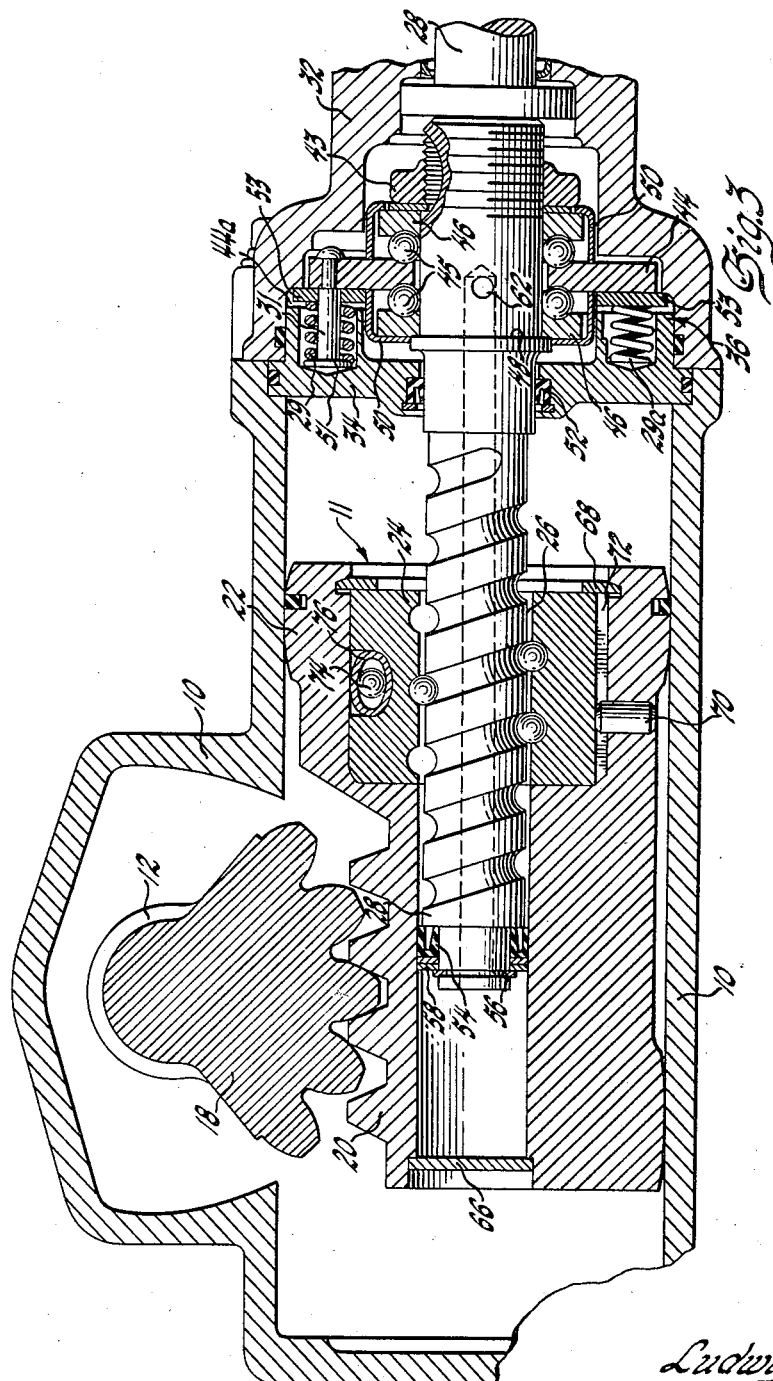
Fig. 3 is a longitudinal section through the gear box taken on line 3—3 of Fig. 1.

Reverting to Figs. 1 and 3, it should be noted that the centering action of the spring 136 in the chamber 132 is aided by the springs 29, 29a associated with the thrust bearing 36, this in view of the connection between the bearing and the valve spool. Thus, on upward reactionary movement of the steering shaft 28, springs 29, being seated against the washer 53, which is incapable of upward or rightward movement by virtue of its shouldering engagement with the steering column 22, must necessarily be compressed by force of the flanged heads 51. This resistance to the upward movement of the shaft 28 does not involve the springs 29a, which are effective only on downward reactionary movement of the shaft when the washer 53 is displaced. Springs 29 on the downward movement interpose no resistance, being carried along in their shown position between the washer and the flanged heads 51.

With the arrangement just described, it has been found that the steering system is reversible to an extent not normally experienced in power steering; indeed, the return of the dirigible wheels of the vehicle to straight ahead position on completion of a turn is substantially as positive and rapid as in the case of a conventional mechanical steering gear.

I claim:

1. In a power steering system including a source of fluid pressure, a fluid motor operably connected to a steering part, and an open-center control valve for said motor comprising a manually actuated, axially movable spool element encased within a housing having therein an inlet passageway and an exhaust passageway, said valve having associated therewith means defining a chamber adapted to confine a body of fluid serving to resist movement of said spool element, said chamber communicating with said source via a conduit including a radial passage in said spool element, the combination of fluid-actuated, spring-biased valve means disposed in an axial bore in said spool element and adapted to block fluid flow to said chamber when the pressure therein reaches a predetermined value set by the spring biasing, the actuating fluid for said valve means being derived from said chamber, and passage means providing for the escape of fluid from said chamber to said exhaust passageway on movement of said spool element following the blocking of said conduit, said last passage being controlled by said valve means.

2. In a power steering system including a source of fluid pressure, a fluid motor operably connected to a steering part, and a control valve for said motor comprising a manually actuated, axially movable spool element and a housing confining said spool element having an inlet passageway and an exhaust passageway therein, said valve having associated therewith means defining a chamber at one end of said spool element adapted to confine a body of fluid serving to resist movement of said spool element, said chamber communicating with said source through a conduit including a radial passage in said spool element, the combination of a spring-biased, fluid-actuated member having an axial passage therein forming part of said conduit and adapted to block fluid flow to said chamber when the pressure therein reaches a predetermined value set by the spring biasing, said member being located in an axial bore in said spool element and having a pressure surface communicating at all times with said chamber, and means including a second radial passage in said spool element providing for the escape of fluid from said chamber to said exhaust passageway on movement of said spool element following the blocking of said conduit.

3. Apparatus conforming to claim 2 in which said chamber has therein spring means supplementing the fluid resistance.

4. In a power steering system including a source of fluid pressure, a fluid motor operably connected to a steering part, and a control valve for said motor comprising a manually actuated, axially movable spool element and a housing confining said spool element having an inlet passageway and an exhaust passageway therein, said valve having associated therewith means defining a chamber at one end of said spool element adapted to confine a body of fluid serving to resist movement of said spool element, said chamber communicating with said source through a conduit including a pair of radial passages in said spool element, the combination of a spring-biased, fluid-actuated member having an axial passage therein forming part of said conduit and adapted to block fluid flow to said chamber when the pressure therein reaches a predetermined value set by the spring biasing, said member being located in an axial bore in said spool element in association with a plug element threaded into said spool element to limit the movement of said member in the direction of the spring biasing and having a pressure surface communicating at all times with said chamber, and means including a third radial passage in said spool element providing for the escape of fluid from said chamber to said exhaust passageway on movement of said spool element following the blocking of said conduit.

5. Apparatus conforming to claim 4 in which said chamber has therein spring means supplementing the fluid resistance.

References Cited in the file of this patent

UNITED STATES PATENTS

| | | |
|---|---|---|
| 2,596,242 | Hill | May 13, 1952 |
| 2,679,234 | Robinson | May 25, 1954 |
| 2,824,314 | Davis | Feb. 25, 1958 |